March 15, 1938.  J. C. OLSEN  2,111,053
BELT FASTENER FOR SIDE DRIVING OR V-BELTS
Filed Aug. 29, 1936  2 Sheets-Sheet 1
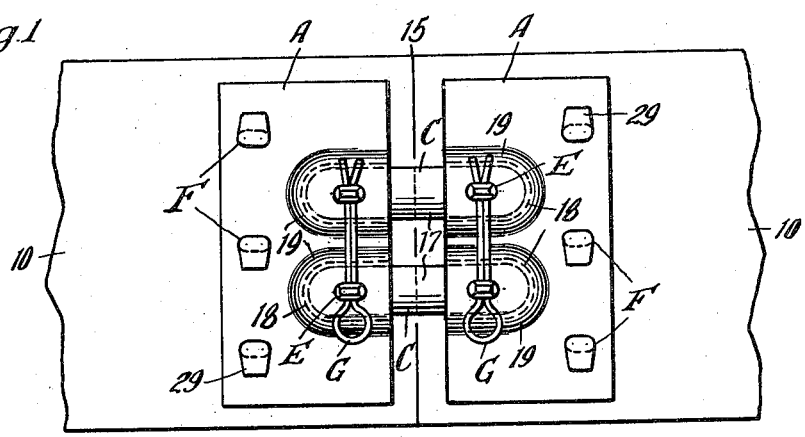
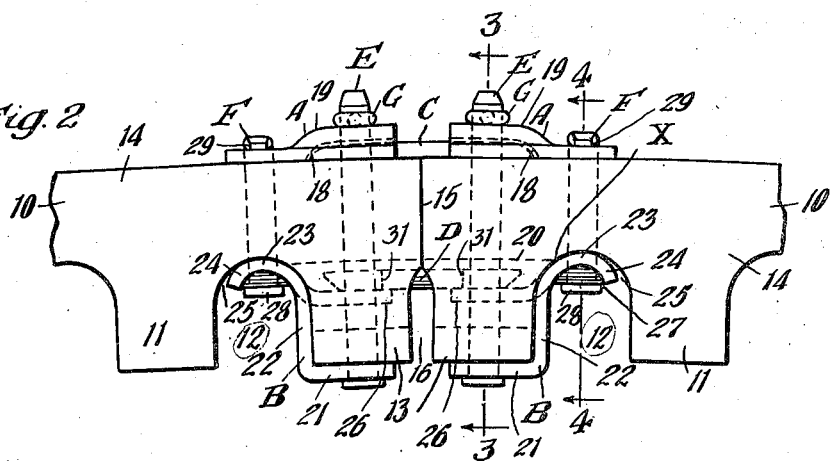
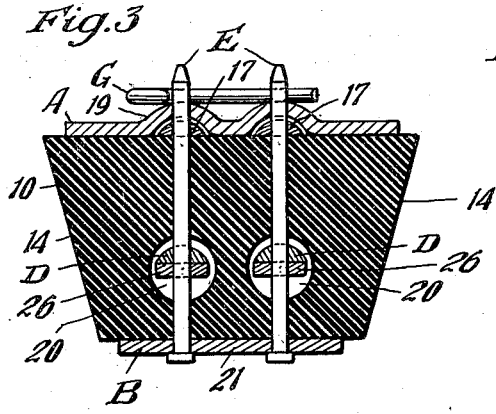
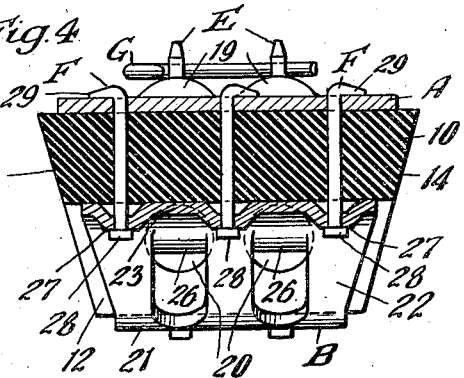
Inventor
John C. Olsen
By Joseph Harris
his Atty.

March 15, 1938.      J. C. OLSEN      2,111,053
BELT FASTENER FOR SIDE DRIVING OR V-BELTS
Filed Aug. 29, 1936      2 Sheets-Sheet 2
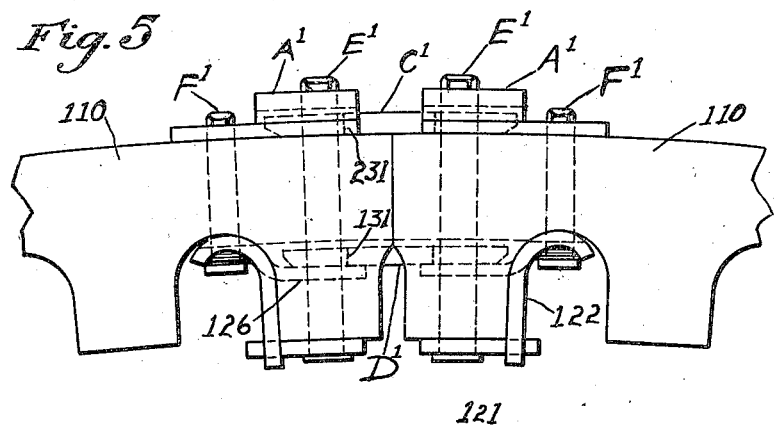
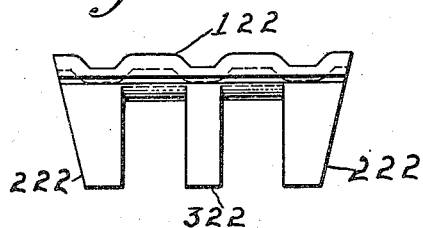
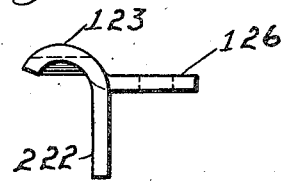
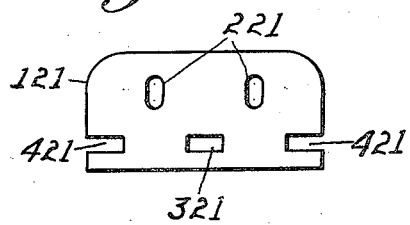
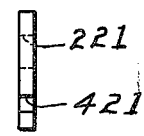
Inventor
John C. Olsen
By Joseph Harris
his Atty.

Patented Mar. 15, 1938

2,111,053

UNITED STATES PATENT OFFICE 2,111,053

BELT FASTENER FOR SIDE DRIVING OR V-BELTS

John C. Olsen, Chicago, Ill., assignor to Flexible Steel Lacing Company, Chicago, Ill., a corporation of Illinois Application August 29, 1936, Serial No. 98,544

14 Claims. (Cl. 24—31)

This invention relates to improvements in belt fastener for side driving or V-belts and, more particularly, fasteners for heavy duty side-driving belts.

One object of the invention is to provide a belt end fastener of unusually rugged construction capable of transmitting heavy loads and attachable to the belt ends in such manner as to effect transfer of the loads to the belt material with a minimization of any tendency to tear out or disrupt the material.

Another object of the invention is to provide a fastener for the ends of notched V-belts such that, although of substantially rigid type, nevertheless permits of sufficient flexibility in the belt to permit the latter to readily accommodate itself to the curvature of the pulleys over which it runs.

A further object of the invention is to provide a belt fastener of the character indicated in the preceding paragraphs such that the fastener when applied, does not distort the cross section of the belt, thus insuring greater efficiency and longer life.

Other objects of the invention will more clearly appear from the description and claims hereinafter following.

In the drawings forming a part of this specification, Figure 1 is a top plan view of adjacent ends of a side driving or V-belt showing the same connected by the improved fastener. Figure 2 is a side elevation of the structure shown in Figure 1. Figures 3 and 4 are transverse or radial sections corresponding to the section lines 3—3 and 4—4 respectively of Figure 2. Figure 5 is a view similar to Figure 2 illustrating a modified form of construction. Figures 6 and 7 are elevational views, at right angles to each other, of one of the parts comprising the lower retainer plate. And Figures 8 and 9 are elevational and edge views, respectively, of the other part of the retainer plate.

In said drawings, and referring first to the construction shown in Figures 1 to 4, 10—10 indicate the adjacent ends of a V-belt of that type intended for heavy duty, the same, as customary, being composed of fabric or cords or both combined with resilient or elastic material such as rubber. As usual, the cross section of the belt is of general trapezoidal form, as best illustrated in Figures 3 and 4, and, on the inner side of the belt, the same is provided with alternated lugs and recesses 11, 12 and 13, the latter indicating the endmost lugs, as indicated in Figure 2. As well understood, the alternated lug and recess construction is to permit the belt to curve or flex readily while passing over the pulleys without undue swelling of the belt, transversely. The driving sides of the belt, as will be understood, are those indicated at 14—14.

In preparing the belt ends for application to the fastener, the belt will preferably be cut slightly out of line of the endmost lugs 13—13, as shown in Figure 2, so that the main or body portion of the belt has the ends thereof abutted as indicated at 15 on the outermost part of the belt and leaving a slight spacing 16 between said lugs 13—13, the object of this construction being to allow relative approach of the lugs 13 when the belt is curved or flexed over the pulleys.

The improved fastener of the Figures 1 to 4 form, as shown, comprises, broadly, two outer plates A—A; two inner plates B—B; a plurality of outer rigid links C—C; a plurality of inner rigid links D—D; a plurality of securing pins or elements E—E; a second set of securing pins or elements F—F; and cotters G—G.

The outer pair of links C—C of rigid construction, are preferably made of approximately semi-cylindrical cross section, as indicated at 17, best shown in Figure 3, with the flat faces thereof bearing on the outermost surface of the belt, the links obviously extending circumferentially of the belt and across the joint 15. The ends of said links 17 are rounded and chamfered as indicated at 18 and the same are loosely seated within correspondingly shaped embossments 19—19 integrally formed on the plates A.

The inner pair of links D—D are somewhat shorter than the outer links C and are disposed within circumferentially extending openings 20 made in the belt ends, said openings being so located as to extend approximately flush with the bottoms of the recesses 12. Said holes or apertures 20 are made when preparing the ends of the belt for attachment of the fastener, and, as will be apparent, are so located as not to injure or remove any of the material from the main load-transmitting portion of the belt. Said links D are preferably of semi-cylindrical cross section, as best shown in Figure 3, and have their ends beveled.

Each of the inner bearing or abutment plates B is of one piece special formation, having an innermost flange 21 overlapping the inner face of the corresponding end lug 13; a main section 22 which snugly fits against the inner surface of the end lug 13; and a curved flange 23 conforming throughout the greater part of its length to the curvature at the bottom of the recess 12, but having its extreme edge 24 so shaped as to leave a slight space 25 between it and the adjacent curved surface of the recess. Each plate B is further provided with integrally formed tangs or flanges 26—26 struck up from the main section 22, said tangs or flanges 26 being so formed as to extend into the holes 20 and overlap the corresponding adjacent ends of the respective links D as clearly shown in Figures 2 and 3. The curved flange section 23 of each plate B is also provided with flat surfaced embossments 27—27, as best shown in Figure 4, to provide suitable flat bearing surfaces against which are seated the heads 28—28 of the securing pins F which are passed through slots provided in said plates B and through correspondingly alined slots in the outer plates A—A, as shown. Each of the securing pins F is preferably retained in place by hammering over its outer tapered or chamfered end as indicated at 29—29.

The plates A and B, links C and D, the tangs or flanges 26 and the flanges 21, are all provided with radially alined openings to receive the securing pins E therethrough as shown, all of said openings, with the exception of those provided in the links D, providing for a relatively snug reception of the pins. The openings in the links D, as indicated at 31, are somewhat elongated so as to allow for a slight amount of lost motion or play between the links D and the pins E, for the purpose hereinafter described. The pins E are preferably retained in place by the cotters G which are extended transversely through the outer projecting ends of the pins, as shown. In practice, all of the pins E and F will preferably be so constructed that the shanks thereof are relatively narrow, considered transversely of the belt, and relatively long, considered circumferentially of the belt and with rounded front and rear edges. With this construction, distortion or swelling of the belt transversely is eliminated.

With the construction shown and described, it will be seen that a relatively rigid type of fastener is provided for the ends of the belt but, at the same time, suitable provision is made to permit of the flexing of the belt in going over the pulleys both by reason of removal of the material in the lugs to provide the holes 20 in which are received the links D and tangs 26; by providing for the lost motion between the links D and pins E; and by leaving the small space 16 between the lugs 13. This combination of features specified effectively serves to prevent lateral spreading or swelling of the belt even though the belt is flexed or curved to a considerable extent.

It will also be seen that each set of inner and outer plates A and B is secured to the belt in a very effective manner by the plurality of pins E and F. In the case of the plates B, each embraces its corresponding endmost lug 13 and, due to the securing pins F, flexing of the lugs 13 relative to the main body portion of the belt, is effectively prevented. When a pull is exerted on the plate B transmitted thereto through the pins E, there would normally be a tendency to exert a leverage action on the lug 13 tending to tear the lug from the main part of the belt about a point approximately as indicated at X. Such leverage action is however counteracted by the flange section 23 of the plate and the securing pins F which hold the plate snugly to the main part of the belt at the extreme bottom of the recess 12. Tearing out of the lug 13 is thus prevented and, at the same time, the endmost lugs 13 are effectively used, under direct shear, in resisting pulling out of the securing pins E and F.

Still another important feature of the construction arises from the following. By locating the flanges or tangs 26 of the plate B within the lugs 13 and relatively closely adjacent to the main body and load-transmitting portion of the belt, the pull transferred to the pins E from the links D is transmitted in such manner as to place the pins E substantially under direct shear against the tangs 26, thus minimizing and substantially eliminating any bending moment on the pins E between their extreme ends. As will be apparent, the pins E are under substantially direct shear at their outer ends where the same pass through the links C and the plates A so that all of the pins E and F are practically free from bending moments and thus provide a connection with the belt that will stand heavy pulling loads. From Figures 2 and 3, it will be seen that a slight clearance is provided between the links 17 and the plates A, the purpose of which is to prevent elongation or stretching of the pins E when the belt is passing over the pulleys.

Referring now to the construction illustrated in Figures 5 to 9, the belt ends 110 are prepared in the same manner as the belt ends 10 previously described. In said modified form, similar outer plates A¹—A¹ are employed, outer links C¹, inner links D¹; and securing pins or elements F¹—F¹. Corresponding securing pins E¹—E¹ are also employed except that, instead of utilizing cotters to retain the same in place, their outer ends are bent over to retain the same in place.

The inner plate construction, while performing the same function as the plates B, are each made in two parts 122 and 121 so formed, as hereinafter described, as to interlock when all of the parts are assembled.

Each of the parts 122, as best shown in Figures 6 and 7, is formed with a rounded flange 123 and integral struck up tangs or flanges 126 similar to the corresponding parts 23 and 26 of the first described construction. The vertically extending sections of the plate 122 are in the form of three transversely separated flanges or arms 222—222 and 322.

The bottom or inside plate member 121 is apertured as indicated at 221 to receive the pins E¹ therethrough. Said plate 121 is also apertured as indicated at 321 and slotted at its edges as indicated at 421—421 to receive the ends of the flanges 222 and 322 of the other plate element 122. When all of the plates and retainer pins are secured in place, as shown in Figure 5, it is evident that the lower plate element 121 will be held against the inner face of the end lug by the pins E¹ and also, on account of the interlock between the flanges 222 and 322 with the plate 121, tension transmitted from the links C¹ and D¹ to the pins E¹ and from the latter to the tangs 126 and plates 121 will in turn be transmitted to the plates 122, thus preventing pulling out or twisting of the end lugs of the belt as described in connection with the construction shown in Figures 1 to 4. By forming the inner plates in two parts, as just described, the cost of manufacture may be appreciably lessened as compared with the all integral form of plates B, shown in Figures 1, 2 and 4.

Also, preferably, both the inner and outer links C¹ and D¹ are provided with elongated recesses through which the pins E¹ are passed as indicated at 131 and 231 so as to allow for a slight amount of lost motion between both the inner and outer links, on the one hand, and the pins E¹, on the other hand.

The invention has been shown with particular reference to a relatively large size V-belt. As will be understood by those skilled in the art, however, the number of links may be either increased or decreased in accordance with the load to be transmitted and the size of the belt, without departing from the spirit of the invention. Other changes and modifications are also contemplated that come within the scope of the claims appended hereto.

What is claimed is:

1. A fastener for adjacent ends of a side driving belt having alternated lugs and recesses on its inner side, said fastener comprising: an outer connector extending from one belt end to the other on the outer side of the belt; a second connector extending from one belt end to the other and having its ends disposed within the material of the belt ends; retainer plates disposed on the outer and inner sides of the belt ends, the plates on the inner side having portions disposed within the recesses and portions disposed within the endmost lugs; and securing elements disposed radially of the belt and extending through the belt material, the plates and the connector ends.

2. A fastener for adjacent ends of a side driving belt having an alternated lug and recess formation on the inner side thereof, said fastener comprising: plates each located in an endmost recess of the belt and bearing against the corresponding endmost lug, each plate having a flange extending in the corresponding endmost lug; a connector member extending across the joint at the belt ends and into the respective endmost lugs and overlapping the corresponding plate flanges; and radially disposed securing pins extending through each set of overlapped flanges and connector member ends.

3. A fastener for adjacent ends of a side driving belt having end lugs and recesses on the inner side thereof, said fastener comprising: securing plates located in each of said recesses and bearing against the corresponding lug, said plates having flanges extending therefrom into the corresponding lug; links extending across the joint of the belt ends and into the lugs and the ends of which overlap the corresponding plate flanges; and securing pins extending radially through the belt ends and sets of overlapping flanges and link ends.

4. A fastener for adjacent ends of a side driving belt having an alternated lug and recess formation on the inner side thereof, said fastener comprising: plates each located in an endmost recess of the belt and bearing against the corresponding endmost lug, each plate having a flange extending in the corresponding endmost lug; a connector member extending across the joint at the belt ends and into the respective endmost lugs and overlapping the corresponding plate flanges; radially disposed securing pins extending through each set of overlapped flanges and connector member ends; and means, on the outer side of the belt, extending between and connecting the outer ends of said pins.

5. A fastener for adjacent ends of a side driving belt having an alternated lug and recess formation on the inner side thereof, said fastener comprising: plates each located in an endmost recess of the belt and bearing against the corresponding lug, each plate having a flange extending in the corresponding endmost lug; a connector member extending across the joint at the belt ends and into the respective endmost lugs and overlapping the corresponding plate flanges; radially disposed securing pins extending through each set of overlapped flanges and connector member ends; and means providing for lost motion between said securing pins and the connector member.

6. A fastener for the ends of a V-belt having alternated lugs and recesses on its inner side, said fastener including: a pair of outer plates; a pair of inner plates, each of the latter being formed to partially embrace an endmost lug and partially disposed within the adjacent recess, each said plate having also an integrally formed tang extended within the belt material toward the belt end joint; a circumferentially extending link disposed in the belt material and having its ends overlapping said tangs; radially disposed securing pins extending through said outer plates, ends of the link and adjacent tangs; and additional securing pins extending radially through each set of inner and outer plates.

7. In a fastener for the ends of a V-belt having an alternated lug and recess formation on the inner side thereof, said fastener including: outer securing plates; a plurality of outer rigid links extending between said plates; a plurality of inner links disposed within the material of the belt; a pair of inner retainer plates having portions thereof disposed within the endmost recesses of the belt and portions extending within the endmost lugs thereof in overlapping relation with said inner links; a plurality of securing pins, each extended through an outer plate, an end of an outer link, an end of an inner link and adjacent overlapping portion of an inner plate; and additional securing pins extending through the plates and belt material.

8. A fastener for adjacent ends of a V-belt having alternated lugs and recesses on the inner side thereof, said fastener comprising: a retainer plate on the outer side of each belt end; a plate on the inner side of each belt end, each of said last named plates being seated within the endmost portions of the belt and partially embracing the endmost lug and provided with an integral tang extended within the endmost lug; an outer link extending between said outer plates; an inner link disposed within the belt material and having its ends overlying said tangs; and securing pins disposed radially of the belt and each extending through alined openings in an outer plate, outer link, inner link and inner plate tang; and additional securing pins extending radially through each set of inner and outer plates.

9. A belt end fastener construction as specified in claim 8 wherein lost motion is provided between said inner link and the securing pins extended therethrough.

10. A fastener for the ends of a V-belt having alternated lugs and recesses on its inner side, said fastener including: a pair of inner plates, each of the latter having a section seated in the bottom of the endmost recess and against the corresponding radially extending face of the endmost lug and a section extending over the inner face of the lug, each said plate having also a tang extended within the endmost lug; a circumferentially extending link disposed in the belt material and having its ends overlapping said tangs; and radially disposed securing pins extending through the ends of said links and adjacent tangs and through said sections of said plates which extend over the inner face of the lugs.

11. A belt end fastener as specified in claim 10 wherein said sections of said plates which extend over the inner faces of the lugs, are formed separately from the other sections of the plates and detachably interlocked therewith.

12. A fastener for the ends of a side driving belt having alternated lugs and recesses on its inner side, said fastener including: outer plates; inner plates, each of the latter having a section seated in the bottom of the endmost recess and against the corresponding radially extending face of the endmost lug and a separately formed but detachably interlocked section extending over the inner face of the lug; radially disposed securing means extending through the belt material and said plates; and connector means extending circumferentially of the belt between and connected at their ends to said securing means.

13. A fastener for adjacent ends of a side driving belt, said fastener including: inner and outer attaching plates adapted to be secured to the inner and outer faces of the belt ends; means for securing said plates to the belt end; a rigid connector adapted to be disposed on the outer side of the belt ends and extend across the joint thereof and beneath the respective outer plates; means connecting said connector with the outer plates, said last named means and the connector having a limited amount of lost motion, circumferentially of the belt, therebetween.

14. An article of manufacture comprising a side driving belt composed in part of elastic material and formed with alternated lugs and recesses on its inner side, the ends of the main body portion of the belt being in abutting relation and the endmost lugs thereof slightly spaced; and means connecting said ends of the belt, said means comprising: a plate located in the endmost recess of each belt end and bearing against the corresponding endmost lug, each plate having a flange extending into the corresponding endmost lug, a connector member extending across the joint at the belt ends and into the respective endmost lugs and overlapping the corresponding plate flanges, said connector member being apertured at its ends, and radially disposed securing pins extending through each set of flanges and respective apertures of the connector member ends, said apertures being of greater extent, circumferentially of the belt, than the securing pins whereby lost motion is provided between said pins and the connector member.

JOHN C. OLSEN.